Oct. 2, 1928.

L. G. PLANT

1,686,103

LOCOMOTIVE TERMINAL

Filed Nov. 29, 1926     6 Sheets-Sheet 2

Patented Oct. 2, 1928.

1,686,103

UNITED STATES PATENT OFFICE.

LELAND G. PLANT, OF CHICAGO, ILLINOIS.

LOCOMOTIVE TERMINAL.

Application filed November 29, 1926. Serial No. 151,445.

This invention relates to terminals for railway locomotives, and particularly terminals for serving locomotives of the type which employ for their normal propulsion, steam generated by combustion of fuel upon the locomotive grate; and the invention has for its object to so arrange the essential constituent elements of the terminal and to provide such facilities thereat that while maintaining the capacity of the locomotive to propel itself for at least as great a proportion of the time of its detention at the terminal as that which obtains in the ordinary method of operating steam locomotive terminals, and preferably for a much greater proportion of the time, the locomotive fire and its attendant disadvantages will be totally banished from the engine house, the locomotive will have a working steam pressure established therein much more quickly after those service operations which involve emptying the boiler, and working pressure, boiler temperature, and desired water level will be economically maintained for any length of time that the locomotive may remain at the terminal without carrying fire on the locomotive grate.

Among the important advantages of eliminating locomotive fuel consumption in the engine house or at housed parking stations as accomplished in this locomotive terminal, are the avoidance of the insertion of locomotive smoke ducts in the roof or use of other smoke disposal means in the engine house, which, as features of the conventional engine house, not only increase the cost and complication involved in its construction, but lead to a large source of heat loss during cold weather, when an effort is being made to warm the interior of the engine house; also maintenance of purer atmospheric conditions for the operatives, since locomotive smoke disposal means are seldom wholly effective in excluding locomotive smoke and gas from the engine house; also the avoidance of noise and expense incident to the use of blower steam, exhausted up the locomotive stacks, in creating draft for fanning locomotive fires; also by such improvement of operating conditions in the locomotive engine house where considerable routine repair and current maintenance work must be conducted, the increase of efficiency of the work, from the standpoints of cost, time consumed, and the results achieved, all of which are seriously impaired by the presence of smoke or gas and the noise of escaping blower steam; also improvement of conditions affecting structural maintenance of the engine house itself through the absence of fumes accompanying locomotive fuel consumption and blower steam, both of which accelerate the corrosion of the engine house structural surfaces and equipment, particularly piping and metallic fixtures; also facilitating compliance with smoke ordinances or otherwise avoiding trespass by objectionable emission of smoke, where the locomotive terminal is situated in a congested municipal area or adjacent a residential district.

By segregating the locomotive fire dumping, housing, and fire building events and maintaining locomotion by extraneously generated steam as provided for in this locomotive terminal, ignition of the fire can be limited to places outside the engine house and the length of time that fires are burned, in locomotives, at the terminal can be restricted to the brief interval in which the fire is being ignited preparatory to departure from the terminal, which constitute further advantages, since legislative penalties imposed for making smoke apply with less severity to smoke from a locomotive outside the engine house than to smoke emitted from the smoke ducts of an engine house, usually classed with industrial and stationary boiler plant stacks in respect to smoke regulation; and where conditions necessitate complete elimination of locomotive smoke and stack gas at locomotive terminals, and smoke washing or other means are employed to this end, the equipment required for washing or otherwise disposing of locomotive smoke and stack gas can be reduced to a capacity only sufficient to assimilate smoke and gas generated during the brief period of fire ignition preparatory to departure. The operation of igniting a fire that has been laid on the locomotive grates can ordinarily be accomplished in five or ten minutes, whereas locomotives held under steam pressure by means of banked fires on the grates, emit smoke and gas during their entire layover period at the terminal. The alternate procedure now practiced viz: dumping the fire on arrival and allowing the steam pressure to die down, rebuilding the fire preparatory to departure and generating a working steam pressure by means of a fire on the grates, cannot ordinarily be accomplished in less than one hour of time. It will be seen, therefore, that either process described necessitates smoke disposal means of several times the capacity required in a terminal embodying the present invention, to effect the complete elimination of locomotive smoke and stack gas where this is required at a locomotive terminal.

In addition to the elimination of the smoke and stack gas ordinarily issuing from locomotives standing for protracted periods at a terminal, the invention is productive of a large and substantial fuel saving by the substitution of steam generated in efficient stationary boilers operating at an economical rate and capable of utilizing relatively cheap fuel, for an equal quantity of steam generated in locomotive fireboxes at an uneconomical rate of combustion and requiring a relatively expensive fuel. The extent of this saving is dependent upon the time that locomotives are held under steam by means of a fire on the grates in comparison with the time that they are held under pressure by steam supplied in stationary boilers; or is dependent upon the quantity of fuel consumed on locomotive grates to generate a working steam pressure in a locomotive boiler compared with the fuel burned in a stationary boiler to generate the quantity of steam required to produce this working pressure at a terminal embodying this invention.

Another advantage derived from a locomotive terminal of this type is its beneficial effect on locomotive boiler maintenance since it is generally conceded that repairs to locomotive boilers and fireboxes are lessened by any reduction in the extent or frequency of temperature changes in the boiler, or by any reduction in temperature variations throughout all parts of the boiler. In a locomotive terminal of this type, in which steam is supplied from a stationary boiler to locomotives standing at the terminal, a more nearly uniform steam pressure is maintained in the locomotive, during the entire time that it is held at the terminal, than is found practicable in every day operation where steam is maintained by means of a fire on the grates. Furthermore, the maintenance of steam pressure by a fire on the grates, while the locomotive is standing at the terminal necessitates constant attendance which, if neglected, may reesult in the water level dropping below the firebox crown sheet and serious damage to the crown sheet from overheating. Whenever it is necessary to empty and refill the locomotive boiler at a terminal the delivery of live steam to the boiler, as provided for in this invention, insures greater uniformity in temperatures throughout all parts of the boiler shell and partitions than when the boiler is filled with water alone. This can be explained by the fact that when cold water is pumped into the boiler the lower portions of the boiler shell and firebox contract more than the upper parts of the shell and when hot water is injected there is somewhat more expansion to the lower surfaces than the upper surfaces of the boiler. On the other hand, if steam is injected directly as provided for in this invention or is combined with the filling water and this mixture injected into the boiler at a temperature above 212° F., the steam rises or is liberated within the boiler and condensed upon the upper surfaces of the shell to secure a rise in the temperature of the upper portion of the boiler corresponding to the rise in the lower surfaces of the boilers as these are immersed in hot water.

In addition to the obvious advantage of smoke abatement and the saving in fuel resulting from the use of efficient stationary steam boilers to establish and maintain a working steam pressure in locomotives at terminals of the type proposed in this invention, there is a practical advantage in dispatching locomotives with clean fires; that is, fires in which there is no large accumulation of ash or partly consumed coal. Where the steam pressure has been generated by fire on the grates, and the engines are held for some time awaiting assignment to duty, there must necessarily have accumulated an appreciable quantity of ash and partly consumed coal on the grates, in keeping up steam pressure and corresponding water temperature in the boiler. Where locomotives are held under steam pressure for an appreciable period by means of fire on the grates, it is often necessary to remove ash from the grates before the locomotive is fit for active service. This condition may either entail additional labor and some delay in the movement of the locomotive or result in the locomotive being dispatched in an impaired condition for efficient service. In a terminal of the type proposed in the present invention, locomotives need have accumulated no appreciable quantity of ash or unconsumed coal on the grates up to the time said locomotives are dispatched for road service.

Another feature of practical importance in this invention is that all of the smoke abatement, fuel economy, and time saving advantages claimed for the invention can be realized in a locomotive terminal of the type proposed without abolishing the essential facilities depended on for locomotive conditioning and dispatch, in conventional types of terminals. For instance, if induced draft and washing apparatus is alone provided for exhausting and cleansing locomotive smoke and gas during the firing up period or while locomotives are being held under steam pressure with banked fires, serious delay in the preparation of locomotives for service and interruption to railway service may result from a power failure or other causes that would temporarily stop the operation of the draft inducing fans. The present invention contemplates an addition to existing facilities without the necessary abolishment of the essential facilities for conditioning and dispatching locomotives at a terminal.

While in the operation of this locomotive terminal it is possible to accomplish the various functions essential to the purposes of the invention without reference to particular trackage arrangement or locomotive turning means employed and the results desired are not contingent upon any particular lay-out of tracks and turntable, further than observance of such a general arrangement of trackage as will avoid conflict of in and out-bound locomotive movements, by way of illustration, the accompanying drawings have been made to show schematically one complete installation of the invention, and, structurally and in detail, the several elements entering into such installation, including two modifications of one of the elements, to-wit, the fire igniting station.

In said drawings—

Figure 4 is an elevational view of apparatus located at a locomotive parking or storage position, for instance, such a view as would be disclosed by a section on the line $4^x$—$4^x$ of Figure 1, drawn on an enlarged scale.

Figures $4^a$ and $4^b$ are axial sections, in two planes at right angles to each other, of a valve embodied in the portion shown in Figure 4.

Figure 5 is a plan view of the portion shown in Figure 4.

Figure 6 shows fire dumping and fire igniting positions conveniently located in relation to the terminal, to-wit, a view afforded by a vertical transverse section on the line $6^x$—$6^x$ of Figure 1, drawn on an enlarged scale.

Figure 7 is a view corresponding to Figure 6, for instance, a view presented by a section, on an enlarged scale, taken on the line $7^x$—$7^x$ of Figure 8, in which is shown a smoke disposal means, and particularly one operating upon the principle of conducting away the smoke to a remote point of disposal, for instance, the smoke washer shown in Figure 8.

Figure 1:
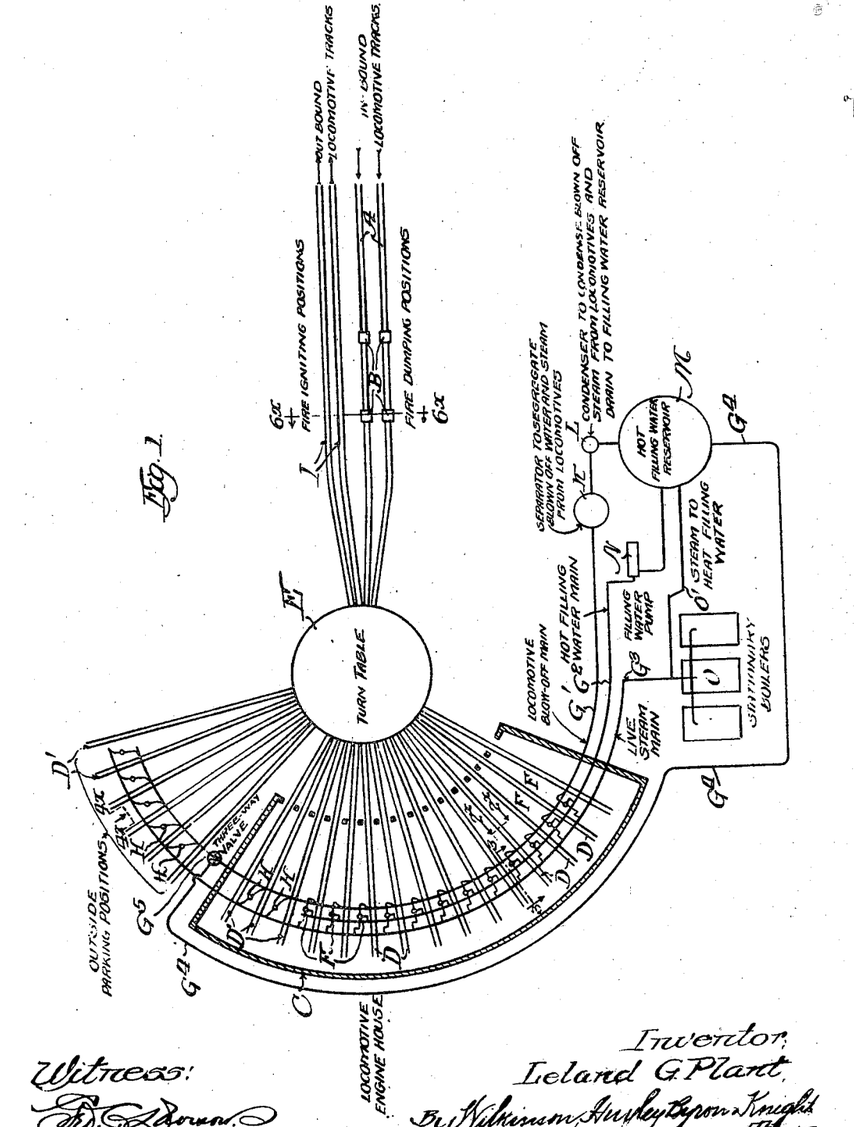
Figure 1 is a diagrammatic view, in plan, of the complete apparatus with its elements identified by legend.

Referring to Figure 1, A represents tracks of any desired number over which locomotives may pass in reaching the engine house; B represents fire dumping stations in the tracks A; C is an engine house of any approved conventional design, for instance, one in which stalls D for locomotives and trackage leading thereto, are arranged radially to a turn table E, through which any track may be connected with the inbound tracks A; F represents drops or pipe connections which, according to the present invention, are preferably of special construction to be hereinafter described, and through means of which a locomotive in any stall may be connected at will with either of three pipe-mains, to-wit, the pipe-main G' serving as a blowoff pipe for conducting the contents of a boiler to separating and heat salvaging apparatus, a filling water pipe-main G² through means of which the boiler may be refilled after it has been blown off, washed out, and received any needed repairs, and a live steam pipe-main G³ through means of which steam is supplied at pressure and temperature suitable for boosting the supply of filling water, maintaining the temperature of the water, and giving the boiler a sufficient quantity of steam to bring it up to self propelling pressure after its complement of water has been received; D' represents parking stalls which may be either inside or outside of the house and in which locomotives may be placed under conditions which involve connecting them, through drop-connections H preferably of special construction, as hereinafter described, merely with the steam supply main G³ or the blowoff main G', or both, for instance, when the locomotives are awaiting admission to a stall suitable for performing special work upon them and pending which it may be desirable to keep up their steam and render them self-propelling, or when they require no repairs or only minor repairs, not involving refilling of their boilers with water, or while awaiting assignment to duty after completion of repairs in other stalls, or even for the purpose, merely, of maintaining the locomotive storage capacity of the terminal, or at such other times as may be found desirable. The said stalls D' are served by the turn-table E as in the case of other stalls.

I represents fire igniting stations at which locomotives can be placed after leaving the engine house or any of the stalls D', and at which the fuel bed, laid either in such station or at any convenient points prior to the engine reaching the same, may be ignited.

In accordance with established practice, blowoff pipe G' will lead to a separator K whence the volatiles pass to a condenser L in which they meet fresh water suitable for filling purposes, giving up their heat to such water, whereupon the water thus heated, together with the water of condensation, pass to the hot water filling reservoir M from which water at suitable temperature may be drawn whenever needed, by means of a pump N and delivered to the filling pipe G². Pipe G³ leads from a source O of live steam, preferably in the form of a stationary boiler which is also adapted, by means of a connection O', to supply heat to the filling water reservoir M and keep up the temperature therein to that desired for boiler filling practice.

Figure 2:
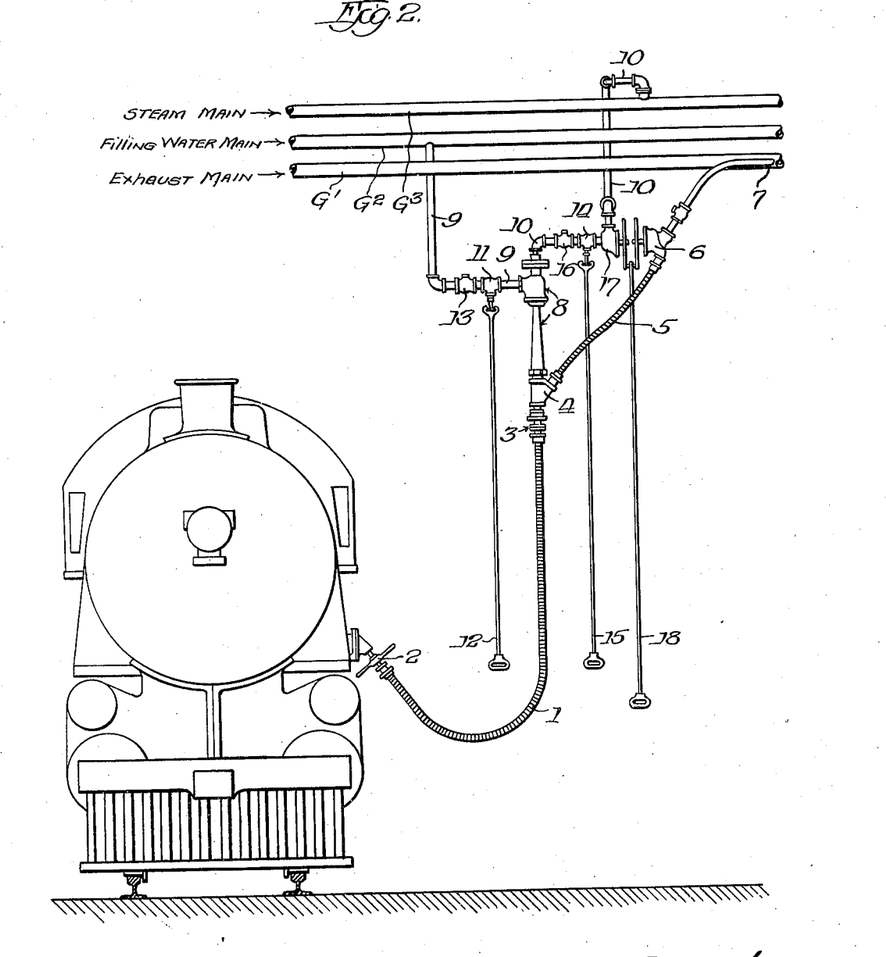
Figure 2 is a detail view showing a locomotive standing at a conditioning and storage position with a portion of the apparatus immediately concerned in the treatment of the locomotive, to-wit, that portion of the apparatus disclosed in elevation, by a section on line $2^x$—$2^x$ of Figure 1, on an enlarged scale.
Figure 3:
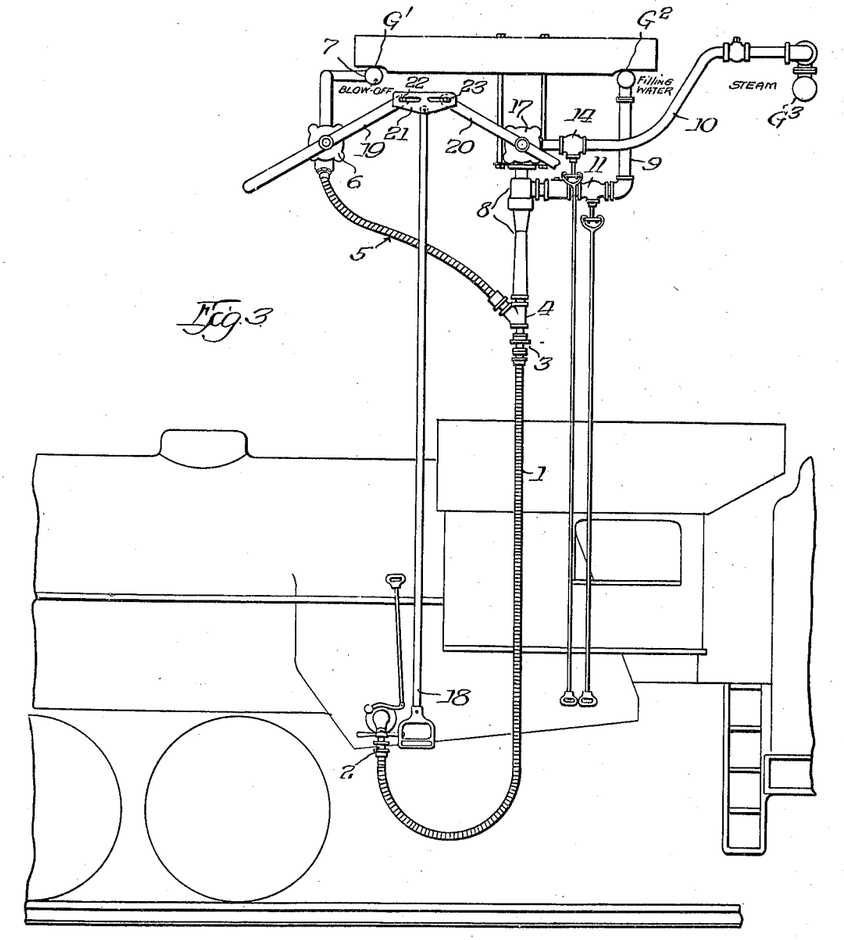
Figure 3 is a view of the portion shown in Figure 2, when viewed from a position to the right of Figure 2, to-wit, that portion of the apparatus disclosed by a vertical section on the line $3^x$—$3^x$ of Figure 1, but on an enlarged scale.

The so-called "drops" or pipe-connections by which the locomotive may be brought into controllable connection with the three pipe-mains G', G², and G³, will preferably follow the structural and operative principle indicated in Figures 2 and 3, wherein 1 represents a flexible hose or pipe adapted to be connected at one end, through means of a flexible coupling 2 provided with handles, for instance, such as will be provided by a wing nut, or through means of an equivalent flexible and easily manipulated connecting element, to the locomotive blow-off valve, and at its other end, through means of a flexible connection 3, to a branch fitting 4 from which extends a flexible hose or conduit 5 leading to valve 6, which is in turn connected to the blowoff main G' at 7; and 8 represents a combining chamber into which a pipe 9 leads from the filling water main G² and a pipe 10 leads from the steam main G³. The filling water pipe 9 is controlled by valve 11 conveniently manipulated through a depending handle 12, and a check valve 13 to resist back flow toward the filling water main; the pipe 10 is similarly provided with a controlling valve 14 manipulated by a drop handle 15, also with a check valve 16 to resist backflow towards the steam main. In addition to the controls so far enumerated, the steam pipe 10 is provided with an additional controlling valve 17 which, together with the valve 6 and the blowoff connector 5, are brought under control of a common drop handle 18, which is so connected with the two said valves 6 and 17, for instance, through means of levers 19 and 20, mounted upon the respective valve stems, and an equalizing yoke 21 having slot and pin connections 22 and 23 with the ends of said levers, that whenever one of said valves 6 or 17 is open the other will be closed and it will not be possible, through mistake, to release live steam into the connector 1 and have it go to waste through the connections 5, 6, and 7 into the blowoff main G'.

Figures 4, 4A, 4B, 5, 6, 7:
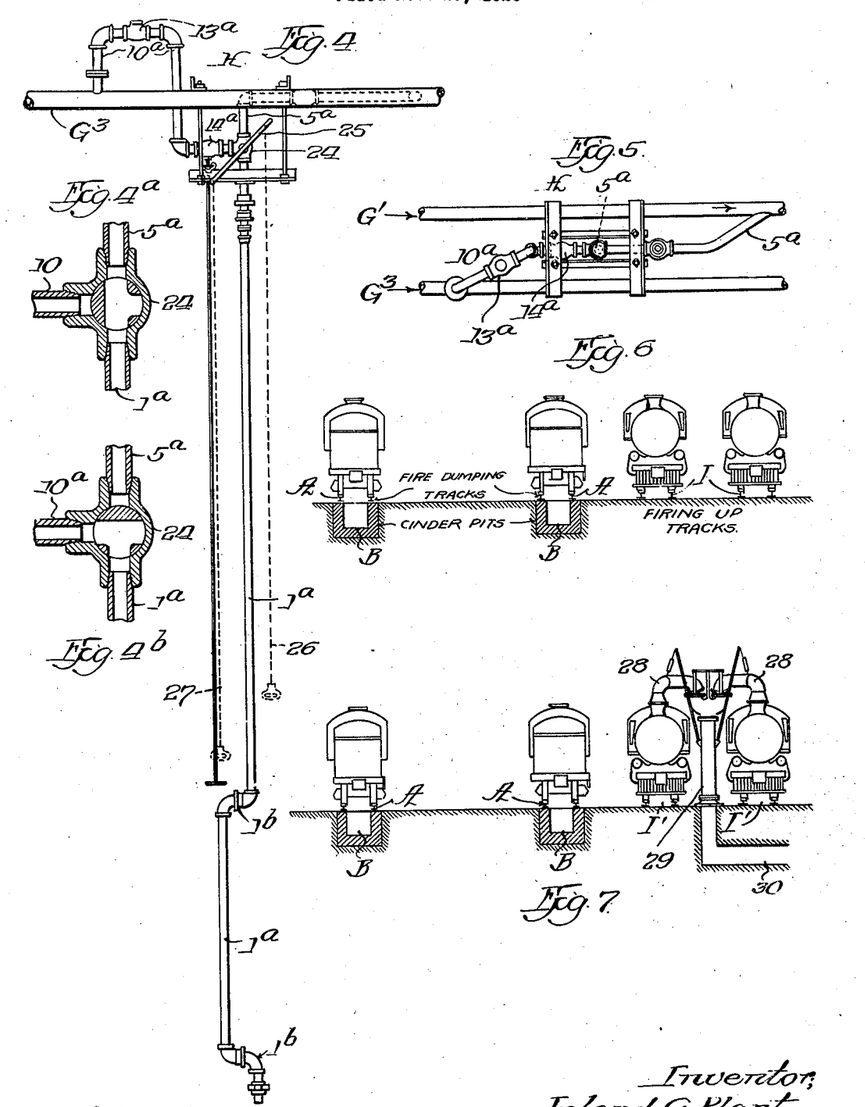

From those locomotive stalls which do not require a supply of filling water, for instance, stalls indicated at D' (Fig. 1), but which do require a supply of live steam for keeping locomotives up to steaming pressure, and facilities for blowing off and reclaiming heat from excess water resulting from condensation of such steam, drop connections H such as illustrated in Figures 4, 4ª, and 4ᵇ may lead to the several mains. Here, the manual control of steam involves a valve 14ª (Figures 4 and 5) located in the steam connection 10ª, comparable in construction and function to the valve 14 of Figure 2, and a two-way or three-port valve 24 located in both the steam connection 10ª and the blowoff connection 5ª and constructed in some suitable manner, such, for instance, as that indicated by the sectional views 4ª and 4ᵇ as to adapt it to be thrown, through means of controlling lever 25 and drop handles 26 and 27, either to a position in which it will open the blowoff connection and close the steam connection, or to a position in which it will open the steam connection and close the blowoff connection, thereby preventing any possibility of opening both said connections at one time, which would result in the waste of steam into the blowoff main G'.

The drop pipe 1ª used for making connection with the locomotive boiler in Figure 4, or at those stalls indicated by the letter D', may, as shown therein, if desired, be made of rigid pipe sections united by hinging joints 1ᵇ. Inasmuch as locomotives at some of the stalls for instance, stalls D' outside of the house will frequently be those which have just come from the operation of boiler washing and refilling at stalls D, excess water accumulating in their boilers from condensation of steam supplied through line G³, will be clean enough to go back to the filling tank directly, rather than to the separator K where only the volatiles are saved. For this purpose a branch blowoff pipe G⁴ leading directly to filling tank M, is connected with the main blowoff line G′ through means of a selective three-way valve G⁵, at such a point in line G′ as will make it possible to blow off from those stalls D′ which are outside of the house to either the separator or the filling tank when desired, and regardless of whether or not the blowoff from stalls D and D′ within the house, to the separator is being carried on.

Figure 10:
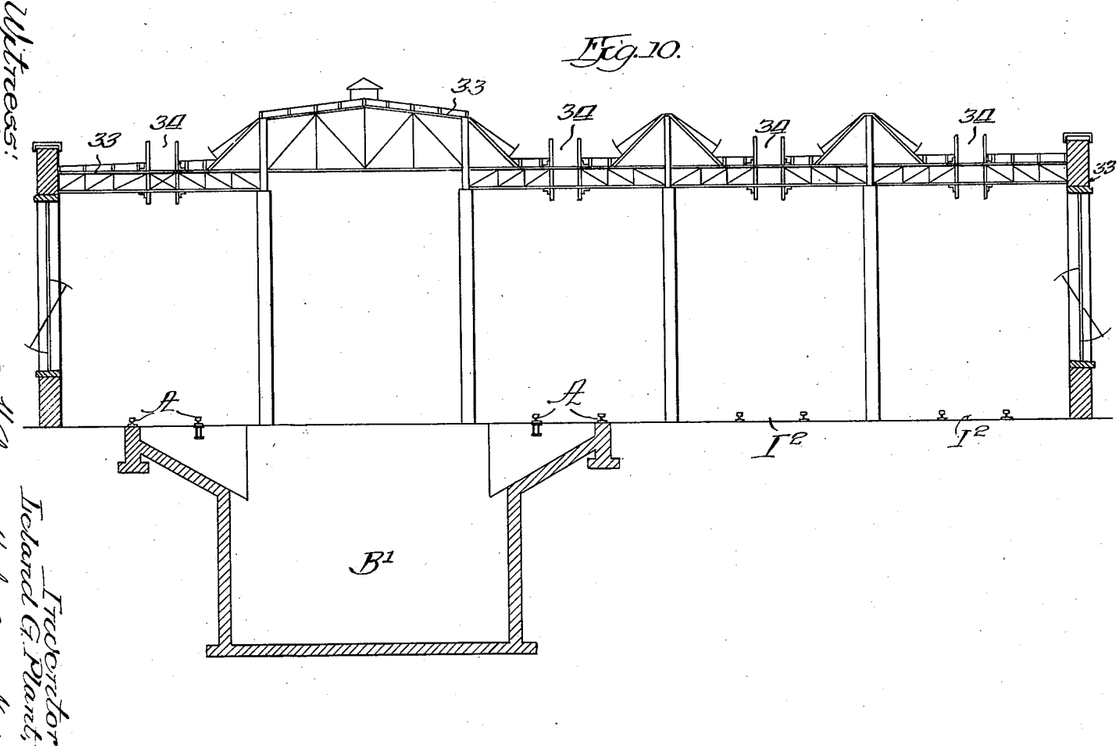
Figure 10 is a vertical transverse sectional view on the line $10^x$—$10^x$ of Figure 9 showing structural details of the shelter of Figure 9 on an enlarged scale.

As suggested in Figures 6 and 7, at the fire dumping stations, cinder pits B may be developed in the form of individual pits of any suitable construction, located under the respective incoming tracks, or as suggested in Figure 10, a relatively large cinder pit B′ may be designed to serve a plurality of such tracks.

Figure 8:
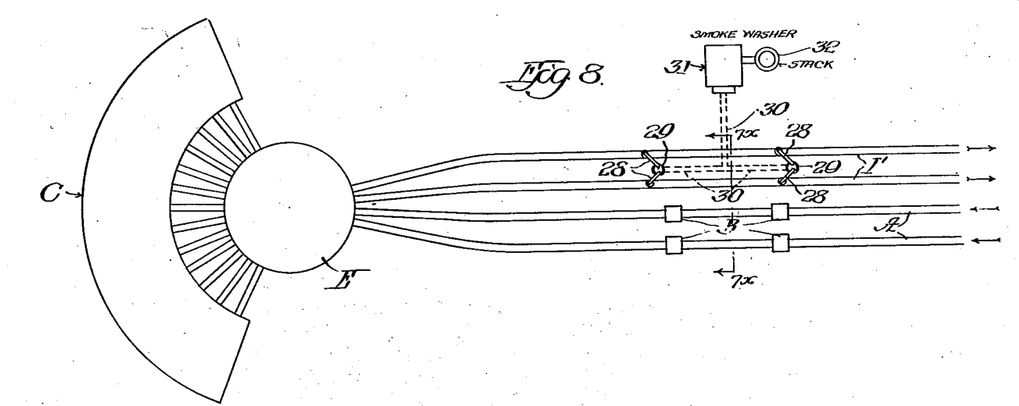
Figure 8 is a plan view of a modified installation indicating location of parts shown in Figure 7, together with a smoke washer and its stack.

As suggested in Figure 6, the fire igniting station I may consist merely in an appropriate location upon the outgoing tracks without special facility for smoke disposal other than through escape into the atmosphere; or it may be, as suggested at I′ in Figures 7 and 8, provided with smoke jacks 28 leading to a down-draft flue 29 whence the smoke is drawn through underground smoke duct 30 through a washer 31 and remotely discharged through a stack 32, all of which parts are of known construction and therefore need only be shown diagrammatically herein.

Figure 9:
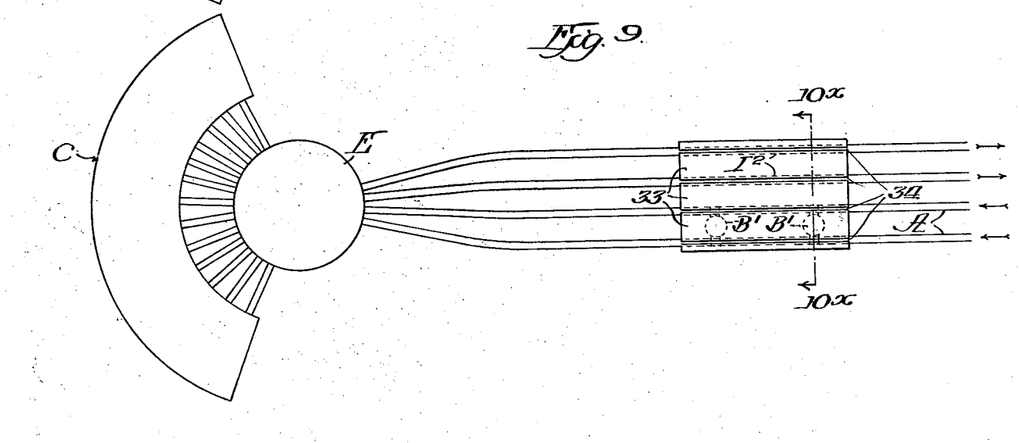
Figure 9 is a plan view showing a modified installation in which the fire dumping and fire igniting positions are provided with a shelter designed to afford necessary protection and light while permitting escape of smoke incident to firing.

A shown in Figures 9 and 10, the fire igniting stations I² may be modified in a manner to provide appropriate shelter 33 with smoke vents 34 extending longitudinally of the trackage and permitting escape of smoke from the locomotive stacks in different positions.

In practicing my invention, a locomotive, in entering a terminal on track A, will be brought to a fire-dumping position B at which the fire and ash are discharged and disposed of. After the fire has been completely discharged from the locomotive, there is in practice sufficient steam and water, at steaming temperature, remaining in the locomotive to enable it to propel itself to a storage station D or D′, where it can be held until wanted for service and where the locomotive may receive the maintenance attention necessary to fit it for service. If such attention does not necessitate emptying the contents of the boiler, the procedure practiced in the present invention will be to establish a pipe connection 1, 10 (Figs. 2 and 3) or 1ᵃ, 10ᵃ (Fig. 4) between the locomotive boiler blowoff valve and a high pressure steam line G³, said pipe connection having a branch connection 5 (Figs. 2 and 3) or 5ᵃ (Fig. 4) to a blowoff main G′. The steam main is supplied with steam generated in an efficient stationary boiler plant O conveniently located for this purpose and preferably adapted to burning a cheaper fuel than required for use on locomotives. As soon as connection 1 or 1ᵃ is securely attached to the locomotive blowoff valve through coupling 2 or any other suitable valved connection in the lower part of the locomotive boiler, the blowoff or other locomotive valve and then the live steam valves 14, 17, or 14ᵃ, 24, controlling admission of live steam to this connection, are opened. The effect of this connection is to establish a steam pressure in the locomotive boiler approximately equal to the steam pressure in the steam supply main and, also, a water temperature throughout the locomotive boiler corresponding approximately to the temperature of saturated steam at the pressure established in the locomotive boiler. This condition in the locomotive boiler is maintained as long as a connection between the steam supply main and the locomotive boiler is maintained. Should the pressure in the steam main G³ fall below the pressure established in any locomotive boiler to which it is connected, the check valve 16 or 13ᵃ inserted in the individual locomotive connection, will prevent a corresponding drop of steam pressure in the locomotive boiler. At any time after the locomotive is thus stored, but preferably as soon as possible after the locomotive has been placed at a storage station and connected with a steam supply as described, a bed of coal is spread evenly over the surface of the grate. During the remaining interval that the locomotive is stored, the temperature of the surrounding firebox surfaces, due to the presence of water at steam temperature within the boiler, tends to evaporate the moisture content from this coal. The effect of thus covering the surface of the grates with coal is to restrict air currents from passing through the firebox and flues of the locomotive boiler.

While the locomotive is thus held at its storage station there will be some condensation of steam which is being supplied through main G³ to the boiler, occasioned principally by radiation of heat from exposed surfaces of the boiler. This will cause the water level in the boiler to rise. Preparatory to returning the locomotive to service, or before that time if the locomotive is held for a protracted period, or when conditions have caused considerable condensation to accumulate in the locomotive boiler at its storage station, the water may be lowered to a desired level in the locomotive boiler by so manipulating the valves 14, 17, and 6, or 14ᵃ and 24, as to intercept the supply of steam and establish connection between the locomotive and the blowoff main G′ above referred to, whereupon the steam pressure above the water in the locomotive boiler will immediately force the water to flow through the path 1, 4, 5, 6 and 7, or through the path 1ᵃ, 24 or 5ᵃ, to the blowoff main G' until a sufficient quantity of water has been exhausted to bring the water level down to the desired height in the locomotive boiler; such water, unless the discharging locomotive be clean, going to the separator K where its volatiles are saved, but otherwise going directly to refill tank M where water as well as volatiles are save. The values are then again manipulated in a manner to discontinue the blowoff and resume steam supply necessary for maintaining a working steam pressure and corresponding water temperature in the locomotive boiler until the locomotive is wanted for service. To place the locomotive in service, the steam supply valve and the boiler blowoff valve on the locomotive are first closed, then the valve in the branch connection to the blowoff main is opened to release whatever steam pressure there may be in the pipe connection between these valves. This pipe connection is then disconnected at 2 from the locomotive blowoff valve, as the locomotive now has sufficient steam pressure to propel itself, and the boiler contains a sufficient body of water at steam temperature to give the locomotive a sufficient reserve steam supply to enable the locomotive to move some distance or be held under pressure for some length of time without fire on the grates. In practicing my invention, therefore, the locomotive moves under its own steam and without a fire on the grates, over the turntable E, to the fire igniting station I, that may comprise simply a track conveniently arranged for dispatching locomotives from the terminal, in which case it may be sufficiently distant from the storage stations to relieve these stations of the presence of any objectionable smoke or gas fumes while fires are being ignited. A fire igniting station may be employed such as shown at I², which is housed in a building 33 and where the locomotive is stationed under the longitudinal smoke duct 34; or a station such as shown at I' may be employed, where smoke ducts 29, 30, and washer apparatus 3 are provided for removing and cleansing locomotive smoke and directing it up the stack 32 during the fire igniting period. In the latter instance a flexible smoke jacket 28 is fitted over the locomotive stack at the fire igniting station I' and the products of combustion are drawn through this smoke jack into the ducts 29, 30, then through the smoke washing machine, in which a portion of the gas is absorbed and solid particles are precipitated by washer, and finally, from this washer through a stack adjacent thereto. Still another alternative consists in a duct system with flexible locomotive stack connections and draft inducing means for conveying the smoke from locomotives in which the fires are being ignited, to some remote point of discharge. Where the fire igniting station is not equipped with draft inducing means, the necessary draft for igniting a fire on the grates may be created by the steam blower provided in the front end of all locomotives of conventional design, steam for this blower being supplied by the locomotive itself. At the igniting station, the fire may be ignited in various ways, as, for instance, by spreading some inflammable matter over the bed of coal, or by applying an oil or a gas torch. All of these methods are in common use except the use of a gas torch, which is new in practice and is proposed as a practical means for minimizing the smoke emitted from locomotive stacks while fires are being ignited. In practicing this invention, however, it has been found that the density of smoke emitted during the firing up period is appreciably diminished by laying the initial fuel bed on the grates where it is subjected to the drying effect of the steam temperature in the fire box for some time prior to igniting the fire.

In practice, it is found that with this invention a fire of sufficient intensity to cause the steam pressure in the locomotive boiler of modern proportions to commence rising, can be obtained in less than ten minutes from the time that the fire is ignited, the locomotive having been held under steam, in the manner described, without fire on the grates. This is attributed in part to the improved circulation of water in the locomotive boiler resulting from the agitation caused by inflowing steam at the storage station and in part to the drying out of the fuel by the heat of the supplied boiler charge, which leaves the volatiles of the fuel more ready to distill off and become ignited. The fire being ignited to a point where it can commence to generate steam in the boiler, the locomotive is ready for service and can be dispatched from the terminal, thus completing the main cycle of operations involved in the movement of locomotives through a terminal of the type identified in that embodiment of the present invention which does not involve emptying and refilling the boiler. Even where emptying and refilling the boiler are needed, the procedure above outlined is not materially altered, except at the storage stations, which, for the last named purpose, are traversed by a filling water main G² adjacent the blowoff and steam mains above referred to. When a locomotive boiler is to be emptied at the storage station, the flexible pipe connection 1, which at these stations leads jointly from the blowoff main G', the steam main G³, and the filling water main G², is attached to the locomotive blowoff valve at 2 (Fig. 2); the locomotive blowoff valve and branch valve 6 to the blowoff main are both opened; and the contents of the boiler are exhausted into the blowoff main, the exhaust flow of water, refuse, and steam being accelerated by the steam pressure in the locomotive boiler until emptied. This water and steam are conducted through the blowoff main to the separating device K (Fig. 1), in which the water is separated from the steam, and from which the volatiles are conducted to the condenser L where they are condensed in contact with cold water, the condensate being delivered to the water reservoir M suitably insulated to retain heat. The separator and condenser employed in the present invention may be of any conventional type now in use but the condenser should preferably be designed to operate at a vacuum so that the maximum quantity of volatiles can be liberated from the water exhausted from locomotives through the blowoff main. When the locomotive boiler is ready to fill, the blowoff branch valve 6 is closed and the filling water branch valve 11 is opened, permitting hot filling water to be pumped from the reservoir above described, through the filling water main G² and branch 9 to a water and steam combining chamber 18 where it mingles with steam supplied through a branch to the steam main. The resultant mixture of water and steam then flows through the flexible pipe connection 1 above described, and is delivered to the locomotive through the boiler blowoff valve at a steaming temperature. As soon as the water reaches the desired level in the boiler, the filling water branch valve 11 is closed and supply of steam is continued, without addition of water, until the pressure in the boiler equalizes with the pressure of the steam supply source, at which point of pressure the steam will be maintained until the locomotive is wanted for service. If, at the time of establishing steam pressure, in the manner described, or subsequently thereto, it is desired to reduce the water level in the locomotive boiler, this can be accomplished by temporarily closing the steam supply valve and opening the blowoff branch valve until sufficient water is exhausted, in the manner already described. This same procedure will be followed if it be desired to perform the conventional step of partially cleansing the boiler by a brief "blow down" previous to departure, a step that the present invention is peculiarly adapted for, since it recovers the heat of the blown off products, and performs the step while steam and water from the extraneous source are still available for restoring water level without loss of boiler temperature, in case the blow down undesirably reduced the water level. After either of the level reducing steps just described, and any necessary restoration of water level has been accomplished, the positions of the aforesaid valves are re-established so that working steam pressure and corresponding water temperatures are maintained on the locomotive until wanted for service, at which time the locomotive is moved to the fire igniting station and prepared for service in the manner already outlined.

I claim:

1. The method of storing steam locomotives at a terminal, which consists in discharging the locomotive fire at a fire dumping station, then placing the locomotive at the storage station, maintaining a working steam pressure with corresponding water temperature throughout the locomotive boiler while at the storage station and without fire in the locomotive, then moving the locomotive by self propulsion from the storage station, and thereafter igniting the fire and dispatching the locomotive for service.

2. The method of storing steam locomotives at a terminal, which consists in discharging the locomotive fire at a fire dumping station, then placing the locomotive at the storage station, maintaining a working steam pressure with corresponding water temperature, accompanied by boiler agitation which renders such temperature uniform throughout the locomotive boiler while at the storage station and without fire in the locomotive, then moving the locomotive by self propulsion from the storage station, and thereafter igniting the fire and dispatching the locomotive for service.

3. The method of storing steam locomotives at a terminal, which consists in discharging the locomotive fire at a fire dumping station, then placing the locomotive at the storage station, maintaining a working steam pressure with corresponding water temperature throughout the locomotive boiler while at the storage station and without fire in the locomotive, subjecting a fresh bed of fuel on the locomotive grate to the drying effect of boiler heat while at the storage station, then moving the locomotive by self propulsion from the storage station, and thereafter igniting the fire and dispatching the locomotive for service.

4. The method of storing steam locomotives at a terminal, which consists in discharging the locomotive fire at a fire dumping station, then placing the locomotive at the storage station, maintaining a working steam pressure with corresponding water temperature throughout the locomotive boiler while at the storage station and without fire in the locomotive, then moving the locomotive by self propulsion from the storage station to a remote position, igniting the fire in the last-named position, there conducting away from the locomotive the products of combustion, and subsequently dispatching the locomotive for service.

5. The method of storing steam locomotives at a terminal, which consists in discharging the locomotive fire at a fire dumping station, then placing the locomotive at the storage station, maintaining a working steam pressure with corresponding water temperature throughout the locomotive boiler while at the storage station, without fire in the locomotive, removing and salvaging water accumulating in the boiler, in excess of the desired level, while at the storage station, moving the locomotive by self propulsion from the storage station, and thereafter igniting the fire and dispatching the locomotive for service.

6. The method of storing steam locomotives at a terminal, which consists in discharging the locomotive fire at a fire dumping station, then placing the locomotive at the storage station, maintaining a working steam pressure with corresponding water temperature throughout the locomotive boiler while at the storage station, without fire in the locomotive, blowing down the boiler, with recovery of blown off products, to partially cleanse the same while at said storage station, moving the locomotive by self propulsion from the storage station, and thereafter igniting the fire and dispatching the locomotive for service.

7. The method of storing steam locomotives at a terminal, which consists in discharging the locomotive fire at a fire dumping station, then placing the locomotive at a storage station, maintaining a working steam pressure with corresponding water temperature throughout the locomotive boiler while at the storage station, without fire in the locomotive, blowing down the boiler, with recovery of blown off products, to partially cleanse the same, and restoring its water to desired level without loss of temperature, while at said storage station, moving the locomotive by self propulsion from the storage station, and thereafter igniting the fire and dispatching the locomotive for service.

8. The method of storing steam locomotives at a terminal, which consists in discharging the locomotive fire at a fire dumping station, placing the locomotive at the storage station, emptying and refilling the locomotive boiler at the storage station and there re-establishing and subsequently maintaining a working steam pressure with corresponding water temperature throughout the locomotive boiler, without fire in the locomotive, then moving the locomotive from the storage station by self propulsion, and thereafter igniting the fire and dispatching the locomotive for service.

9. In a steam locomotive terminal, a locomotive fire disposal station, a locomotive storage station segregated from said fire disposal station, a fire igniting station remote from said storage station, means at said storage station for establishing in a locomotive, without application of fire thereto, steam at a pressure and water at a temperature that render the locomotive capable of propelling itself from said storage station to said fire igniting station.

10. In a steam locomotive terminal, a locomotive fire disposal station, a locomotive storage station segregated from said fire disposal station, a fire igniting station remote from said storage station, means at said storage station for establishing in a locomotive, without application of fire thereto, steam at a pressure and water at a temperature that render the locomotive capable of both propelling itself from said storage station to said fire igniting station, and there inducing a desired draft upon its own fire.

11. In a steam locomotive terminal, a locomotive fire disposal station, a locomotive storage station segregated from said fire disposal station, a fire igniting station remote from said storage station, means at said storage station for establishing in a locomotive, without application of fire thereto, steam at a pressure and water at a temperature that render the locomotive capable of propelling itself from said storage station to said fire igniting station, said means comprising a source of steam and a source of heated water, both of which are extraneous to the locomotive.

12. In a steam locomotive terminal, a locomotive fire disposal station, a locomotive storage station segregated from said fire disposal station, a fire igniting station remote from said storage station, means for establishing in a locomotive, without application of fire thereto, steam at a pressure and water at a temperature that render the locomotive capable of propelling itself from said storage station to said fire igniting station; said means comprising a source of steam and a source of heated water, both of which are extraneous to the locomotive, and connections at said storage station adapted to establish communication between the boiler of the locomotive and said steam and water sources, individually or concurrently, at will.

13. In a steam locomotive terminal, a locomotive fire disposal station, a locomotive storage station segregated from said fire disposal station, a fire igniting station remote from said storage station, means for establishing in a locomotive, without application of fire thereto, steam at a pressure and water at a temperature that render the locomotive capable of propelling itself from said storage station to said fire igniting station; said means comprising a source of water at steaming temperature, extaneous to the locomotive, and a connection establishing communication between the boiler of the locomotive and said water source, at will.

14. In a steam locomotive terminal, a locomotive fire disposal station, a locomotive storage station segregated from said fire disposal station, a fire igniting station remote from said storage station, means for emptying the boiler of a locomotive at said storage station, and re-establishing therein, without application of fire thereto, steam at a pressure and water at a temperature that render the locomotive capable of propelling itself from said storage station to said fire igniting station; said means comprising a blowoff main, salvaging apparatus receiving blown off products from said main, extraneous sources of steam and heated water, and valved connections at the storage station adapted to establish communication between the locomotive boiler and said main, or either of said sources selectively, at will.

15. In a steam locomotive terminal, a locomotive fire disposal station station, a locomotive storage station segregated from said fire disposal station, a fire igniting station remote from said storage station, means for emptying the boiler of a locomotive at said storage station, and re-establishing therein, without application of fire thereto, steam at a pressure and water at a temperature that render the locomotive capable of propelling itself from said storage station to said fire igniting station; said means comprising a blowoff main, salvaging apparatus receiving blown off products from said main, extraneous sources of steam and heated water, and valved connections at the storage station adapted to establish communication between the locomotive boiler and said main, or with both of said sources proportionately at will.

16. In a steam locomotive terminal, a locomotive fire disposal station, a locomotive storage station segregated from said fire disposal station, means at said storage station for maintaining in a locomotive, without application of fire thereto, steam at a pressure that renders the locomotive capable of propelling itself away from said storage station and for periodically reducing the water of the boiler to a desired level; said means comprising a source of steam extraneous to the locomotive, a blowoff main, salvaging apparatus receiving blown off products from said main, and connections adapted to establish communication between the boiler of the locomotive and said steam source and main alternately, at will.

17. In a steam locomotive terminal, a locomotive fire disposal station, a locomotive storage station segregated from said fire disposal station, means at said storage station for establishing in a locomotive, without application of fire thereto, steam at a pressure that renders the locomotive capable of propelling itself away from said storage station, and for blowing down or partially evacuating the boiler and re-establishing water therein, at a desired level and at temperature appropriate to such pressure, said means comprising a source of water at steaming temperature, extraneous to the locomotive, a blowoff main, means receiving and salvaging products blown off through said main, and connections establishing communication between the boiler of the locomotive and said water source and main, alternately, at will.

18. In a steam locomotive terminal, a locomotive storage station, and means at said station for establishing and maintaining in a locomotive, without the application of fire thereto, steam at a pressure and water at a temperature that render the locomotive capable of propelling itself away from said storage station and maintaining the locomotive in such condition until assigned for duty, said means including a supply main, a blowoff main, connections adapted to establish communication between the boiler of the locomotive and said mains, and a selective valve device with single operating means controlling both of said connections and constructed to close either of said valves when the other is opened, thereby establishing such communication with the respective mains alternatively at the will of the operator.

19. In a steam locomotive terminal, a locomotive fire disposal station, a locomotive storage station segregated from said fire disposal station, a fire igniting station remote from said storage station, means at said storage station for establishing in a locomotive, without application of fire thereto, steam at a pressure and water at a temperature that render the locomotive capable of both propelling itself from said storage station to said fire igniting station, and there inducing a desired draft upon its own fire; said fire igniting station being provided with ducts for conveying products of combustion from said locomotive to a remote point of disposal.

20. In a steam locomotive terminal, a locomotive fire disposal station, a locomotive storage station segregated from said fire disposal station, a fire igniting station remote from said storage station, means at said storage station for establishing in a locomotive, without application of fire thereto, steam at a pressure and water at a temperature that render the locomotive capable of both propelling itself from said storage station to said fire igniting station, and there inducing a desired draft upon its own fire; said fire igniting station being provided with ducts for conveying products of combustion from said locomotive to a remote point of disposal, and washing apparatus at an intermediate point in said ducts, constructed to precipitate solids and absorb gas from said products of combustion.

21. In a steam locomotive terminal, a locomotive fire disposal station, a locomotive storage station segregated from said fire disposal station, a fire igniting station remote from said storage station, means at said storage station for establishing in a locomotive, without application of fire thereto, steam at a pressure and water at a temperature that render the locomotive capable of both propelling itself from said storage station to said fire igniting station and there inducing a desired draft upon its own fire; said fire igniting station being provided with ducts for conveying products of combustion from said locomotive to a remote point of disposal, and with draft inducing means, extraneous to the locomotive, at a suitable point in said ducts adapted to supplement draft on the fire.

Signed at Chicago, Illinois, this 22nd day of November, 1926.

LELAND G. PLANT.